United States Patent [19]
Yamashita

[11] Patent Number: 5,268,765
[45] Date of Patent: Dec. 7, 1993

[54] IMAGE SENSOR AND IMAGE SENSOR CHIPS THEREFOR INCLUDING DUMMY PHOTOCELLS AND INTERNAL DISCHARGE SWITCHES

[75] Inventor: Hiromi Yamashita, Amagasaki, Japan

[73] Assignee: Mitsubishi Denki Kabushiki Kaisha, Tokyo, Japan

[21] Appl. No.: 868,679

[22] Filed: Apr. 15, 1992

[30] Foreign Application Priority Data

Apr. 15, 1991 [JP] Japan ................................ 3-108269
May 8, 1991 [JP] Japan ................................ 3-131695

[51] Int. Cl.$^5$ ........................ H04N 3/14; H04N 5/335
[52] U.S. Cl. ........................... 358/213.31; 358/213.11; 250/208.1
[58] Field of Search ....................... 358/213.31, 213.16, 358/213.11, 482, 494; 250/208.1, 578

[56] References Cited

U.S. PATENT DOCUMENTS

| | | | |
|---|---|---|---|
| 4,484,223 | 11/1984 | Tsurekawa | 358/213.16 |
| 5,043,719 | 8/1991 | Nakagawa et al. | 358/213.11 |
| 5,070,236 | 12/1991 | Miyake | 250/208.1 |
| 5,109,440 | 4/1992 | Kawahara et al. | 358/213.31 |

FOREIGN PATENT DOCUMENTS

| | | |
|---|---|---|
| 382540 | 8/1990 | European Pat. Off. |
| 61-089074 | 5/1986 | Japan . |
| 63-76667 | 4/1988 | Japan . |
| 1-183257 | 6/1989 | Japan . |
| 2137850 | 10/1984 | United Kingdom . |

OTHER PUBLICATIONS

Mitsubishi Catalogue, pp. 1-17, Sep. 1991.

Primary Examiner—Joseph Mancuso
Assistant Examiner—Wendy R. Greening
Attorney, Agent, or Firm—Rothwell, Figg, Ernst & Kurz

[57] ABSTRACT

An image sensor and image sensor chip therefor which generates a reference level for the dark output during the blanking period of the sensor and which provides internal switching for removing residual charge from a waveform shaping capacitor. In one embodiment, image sensor chips are arranged in a line and cascaded to form an image sensor and a dummy photocell is provided which is configured similarly to the image sensor photocells and which has its windows shielded from light. A dummy select switch selectively makes connections with a signal line to which the signals from the image sensor photocells are outputted. The dummy select switch remains closed after completion of the drive period of the photocells at the last image sensor chip and the output of the dummy photocell is used as the reference level for the dark output during the blanking period. In another aspect of the invention, a switch is provided within the chip to remove residual charge from the waveform shaping capacitor.

11 Claims, 8 Drawing Sheets

IMAGE SENSOR AND IMAGE SENSOR CHIPS THEREFOR INCLUDING DUMMY PHOTOCELLS AND INTERNAL DISCHARGE SWITCHES

BACKGROUND OF THE INVENTION

The present invention relates to an image sensor, in particular of the contact-type, and a plurality of image sensor chips so mounted and connected as to constitute such an image sensor. The image sensor of this type may for example be used as a reading part of an image scanner reading image information.

FIG. 1 is a circuit diagram for an image sensor chip (integrated circuit) in the prior art, such as is disclosed, for example, on page 20 of a catalog of Mitsubishi Denki Kabushiki Kaisha (title: "Mitsubishi Contact-type Image Sensors" No. H-C0274-B HQ 9007 (ROD), published in July, 1990).

Referring to the figure, a plurality of photocells 1-1 to 1-N, which may be formed of photo-transistors, receive light from a document or the like (the depiction of which is omitted) and convert the brightness of received light into electrical signals, which are called image signals, in time with clock pulses CLK, shown in FIG. 2. The photocells are arranged in a straight line. An electrode pad 2 is provided for input of the electric power $V_{DD}$ that is supplied to the photocells 1.

A signal line 3 is provided for transmission of the image signals from the photocells 1-1 to 1-N. Channel select switches 4-1 to 4-N which are composed, for example, of n-channel MOS transistors, are provided for the respective photocells 1-1 to 1-N, and selectively connect the corresponding photocell to the signal line 3.

An electrode pad 6 is provided for input of a shift signal (also called a start pulse) SI having a duration of one clock cycle and having a rising edge coincident with the falling edge of a clock pulse as shown in FIG. 2. The shift signal that has been entered is shifted sequentially through a shift register 5. Another electrode pad 7 is for input of the clock pulses CLK for the shift register 5.

The shift register 5 serves as a switch driver circuit, being activated by the shift signal SI, and performing successive closure of the channel select switches 4-1 to 4-N in accordance with the clock pulses CLK. This may be paraphrased by "passage of the shift signal SI through the shift register 5." Specifically, the shift register 5 comprises cascaded D-type flip-flops 5-1 to 5-N provided for the respective channel select switches 4-1 to 4-N: Q outputs of the flip-flops (except the last flip-flop 5-N) are connected to the D input terminals of the next flip-flops, the Q output of the last flip-flop 5-N forms the output of the shift register 5. The Q outputs of the flip-flops 5-1 to 5-N are connected to the control terminals of the channel select switches, i.e., the gates of the n-channel MOS transistors 4-1 to 4-N. The Q output of the first flip-flop 5-1 rises at the falling edge of a clock pulse CLK and one clock cycle after the rise of the shift pulse SI, and the Q outputs of the flip-flops 5-1 to 5-N are successively made High for a duration of one clock cycle, with the rising edge of each Q output being coincident with the falling edge of the clock pulse. As a result, the channel select switches 4-1 to 4-N are successively made ON or conductive, so that the image signals from the photocells 1-1 to 1-N are output successively (in the illustrated example, in the order of 1-1, 1-2, 1-3, ... 1-N) via the common signal line 3 and through an image signal output (SIG) terminal 11.

A flip-flop 8 is configured to shape the shift signal that has been shifted through the shift register 5 so as to form a shaped signal SO which is output via an electrode pad 9 and supplied to the next image sensor chip as an input shift signal SI therefor. More specifically, the Q output of the flip-flop 8 rises at the rising edge of a clock pulse, and ½ clock cycle after the rise of the Q output of the last flip-flop 5-N in the shift register 5. By providing such a pulse to the next image sensor chip, the Q output of the first flip-flop 5-1 in the shift register in the next image sensor chip rises one clock cycle after the rise of the Q output of the last flip-flop 5-N in the shift register 5 in the image sensor chip under consideration.

Another flip-flop 10 is set by the shift signal SI input to the electrode pad 6 and reset by the output SO of the flip-flop 8. In other words, the flip-flop 10 continues to output a High-level signal, after the image sensor chip is activated by the input shift signal SI and until the end of the operation of the shift register 5, i.e., after the input of the shift signal SI to the flip-flop 5-1 until the output of the shift signal SO from the flip-flop 8.

An electrode pad 11 is for sending the image signals on the signal line 3 to the outside of the sensor.

A chip select switch 12 connects the signal line 3 to the electrode pad 11 in accordance with the output of the flip-flop 10 throughout the period in which the photocells 1-1 to 1-N within the chip are driven. The chip select switch 12 is closed or conductive when it receives a High level signal from the flip-flop 10.

A reset switch 13 connects, at regular intervals in accordance with the clock pulses, the signal line 3 to an electrode pad 14, which is grounded.

Both the reset switch 13 and the chip select switch 12 above described may be formed, for example, of n-channel MOS transistors.

FIG. 3 is a block diagram showing a contact-type image sensor formed from a plurality of sensor chips, 15-1, 15-2 and 15-3, each of which is configured as shown in FIG. 1. The image sensor chips 15-1, 15-2 and 15-3 are all mounted on a common board, schematically illustrated by a block of dotted line 30, and arranged in a straight line, and cascaded by means of the respective electrode pads 6 and 9 so that the initial shift signal SIO is applied from a terminal 26 to the electrode pad 6 of the first image sensor chip 15, and the output shift signal SO from the electrode pad 9 of each image sensor chip 9 is applied as the input shift signal SI to the electrode pad 6 of the succeeding image sensor chip 15.

Although the image sensor is shown to be formed of three sensor chips, it may be formed of any other number of sensor chips.

The electrode pads 7 are connected together to a terminal 27 on the board 30. Clock pulses CLK are applied from outside to the terminal 27 and then to the electrode pads 7 of the sensor chips 15.

The electrode pads 11 are connected together to a terminal 31 on the board. The image signals from the photocells in the sensor chips are output through the respective electrode pads 11 and all to the terminal 31.

FIG. 4 is a timing diagram showing the operation of the image sensor chip 15, in which SI designates the shift signal, CLK designates the clock pulse, and SIG designates the image signal.

The first image sensor chip 15 receives the initial shift signal SI (the initial shift signal is also denoted by SIO)

supplied from the terminal 26 and the clock pulse CLK supplied from the terminal 27 at the electrode pads 6 and 7 respectively. This shift signal SI is read into the shift register 5 at the falling edge of a clock pulse CLK, and is passed sequentially through the flip-flops within the shift register 5 in synchronism with the clock pulse CLK. Accordingly a driver signal is applied sequentially from the shift register 5 to each of the channel select switches 4-1 to 4-N, which are thereby closed successively. While each channel select switch is closed, the image signal from the corresponding photocell is output via the signal line 3 and through the SIG terminal 11. When the channel select switch is opened, the output of the image signal from the corresponding photocell is stopped, and the the shift signal is transferred to the flip-flop in the next stage.

The shift signal that has been passed out of the shift register 5 is sent to the flip-flop 8, and becomes the shift signal for the next image sensor chip 5, and is output via the electrode pad 9.

Meanwhile, as the channel select switches 4 are closed sequentially one channel at a time, the image signal SIG generated at the photocell 1 corresponding to the closed channel select switch is sent sequentially to the common signal line 3.

The flip-flop 10 continues to output a High-level signal and hence the chip select switch 12 is ON (conductive) throughout the period in which the channel select switches are ON. Accordingly the image signal SIG, which has been sent from the photocells 1-1 to 1-N to the signal line 3 is output via the chip select switch 12 to the electrode pad 11, and then to the terminal 31.

When all of the photocells have been selected, the shift signal is supplied from the shift register 5 to the flip-flop 8. As the flip-flop 10 is reset by the Q output of the flip-flop 8, the chip select switch 12 is turned off.

A reset switch 13 is interposed between the grounded electrode pad 14 and the signal line 3, and is turned on during a High-level period of clock pulse CLK. Accordingly, the signal line 3 is discharged while the clock pulses CLK is High, and the photocell (the emitter of the photo-transistors forming the photocell) which has just finished outputting the image signal SIG (over the Low period of the clock signal CLK) is lowered to the ground potential. In other words, it is forcibly reset.

The voltage level (potential of the signal line 3) is thereby forcibly lowered to the ground potential immediately after the image signal is output from each photocell. If the signal line 3 were not forcibly lowered to the ground level after the image signal is read from each photocell, the remaining potential level would be added to the potential level of the image signal subsequently read out, so accuracy of the image signal would be degraded.

The subsequent image sensor chips 15 operate in the same manner, using the signal SO from the preceding image sensor chip 15 as the input shift signal SI, and receiving the clock pulse CLK from the terminal 27.

There may be further provided a capacitor 28 (normally of about several hundred pF). The function of the capacitor 28 in this circuit is to shape the waveform of the image signal (FIG. 4) from the SIG terminals 11 of the image sensor chips 15-1 to 15-3, into an integral wave, as shown in FIG. 5 at (c), before the signal is output through the SIG terminal 31.

FIG. 5 is a time chart showing the signals on the terminals of a contact-type image sensor. As is shown in the figure, the signal for one line, which is output on the terminal 31 from this contact-type image sensor, consists of an image signal portion that includes image information and a blanking portion that does not.

FIG. 6 is a timing diagram showing an enlargement of the portion A in FIG. 5, in which VB is a level of the signal during the blanking portion. Due to the fact that the signal line 3 is at a high impedance, the level VB is an indeterminate value that is affected, inter alia, by the parasitic capacitance CF shown by broken line in FIG. 3.

Since image sensor chips in accordance with the prior art are configured as described above, the level VB that is present in the blanking portion is indeterminate. Thus the reference level is not present in the output signal, making it necessary to establish an absolute value for the dark output. This level changes due to external factors such as temperature or voltage, with concomitant changes in image brightness leading to degradation of image quality.

Another problem associated with the prior art contact-type image sensor will next be described with reference to FIG. 7.

In the above-described prior-art image sensor chips, when the operation of the shift register 5 is completed, i.e., when the image signal from the photocells 1-1 to 1-N is all output through the SIG terminal 11, the chip select switch 12 is opened, so even if the switch 13 is closed, the potential on the electrode pad 11 and the line connecting the pads 11 of all the sensor chips to the external terminal 31 is not forcibly lowered to the ground level. As a result, as shown at (b) in FIG. 7, when the image signals of each image sensor chip for the image sensor are all output, the potential of the image signal on the terminal 31 is not lowered to the ground level (because of the remaining charge on the capacitor 28), and, a condition is brought about, in which, despite that the image signal is all output, the output of the image signal is still at a certain level. Accordingly, it is not possible to obtain accurate image signals.

In order to remove the remaining charge from the capacitor 28, a switch 29 may be additionally provided and controlled to be conductive when the clock pulse CLK is High. Then, an accurate image signal is obtained as shown at (c) in FIG. 7. The use of the external switch 29 however requires a space on the board 30 (on which the chips are also mounted) and increases the cost.

SUMMARY OF THE INVENTION

An object of the present invention is to provide an image sensor chip which generates a reference level for the dark output in the blanking portion of the output signal of the image sensor.

Another object of the invention is to provide image sensor chips for a contact-type image sensor which, by internally providing a switch for forcibly removing the remaining electric charge from the capacitor, eliminates the necessity of externally providing a switch for removing the remaining electric charge, thereby reducing the cost, and eliminates the necessity of securing a space for the switch on the board.

An image sensor chip in accordance with a first aspect of the present invention comprises:

a plurality of photocells which are arranged in a line and generate image signals indicating brightness of light reflected from a document or the like;

a signal line on which is output the image output signals from said photocells;

channel select switches provided for the respective photocells and selectively connecting the corresponding photocell to said signal line;

a switch driver circuit which sequentially drives said channel select switches one channel at a time;

a chip select switch that connects said signal line to the outside only during the period in which said photocells are being driven;

a dummy photocell of a configuration similar to that of said photocells, the sensor of which is shielded from the light;

a dummy select switch that selectively connects said dummy photocell to said signal line;

a driver that generates a signal which continuously drives said dummy select switch after the period during which said photocells are driven; and a controller that controls the validity/invalidity of the output signal of said driver on the basis of an externally applied condition.

On the basis of the external condition (which is determined for example whether or not the sensor chip is arranged at the last stage in the image sensor) the controller makes the driver output signal valid after all the photocells in the chip have been driven, and the dummy photocell is then kept connected to the signal line, so that a reference level for the dark output is produced in the blanking portion of the output signal of a contact-type image sensor.

The image sensor chip for an image sensor according to another aspect of the invention is provided with:

a plurality of photocells which output an electric current upon detection of light;

channel select switches respectively connected to the output parts of the photocells;

a shift register activated by a shift signal and performing successive on/off control over the channel select switches in accordance with the clock pulses thereby to successively output the image signals output by the photocells via a common signal line and through an image signal output terminal;

a chip select switch inserted between the signal line the image signal output pad and closed only during the operation of the shift register; and a switch connected between the image signal output pad and the ground terminal and repeating opening and closing depending on the level of the clock pulse.

Since the switch which repeatedly turns on and off in response to the clock pulse is provided within the chip between the image signal output terminal and the ground terminal, the remaining electric charge is forcibly removed from the waveform-shaping capacitor, and accurate image signal is obtained and there is no need to secure a space on the board for a switch for the same purpose.

DETAILED DESCRIPTION OF THE PREFERRED EMBODIMENTS

First Embodiment

Figure 8:
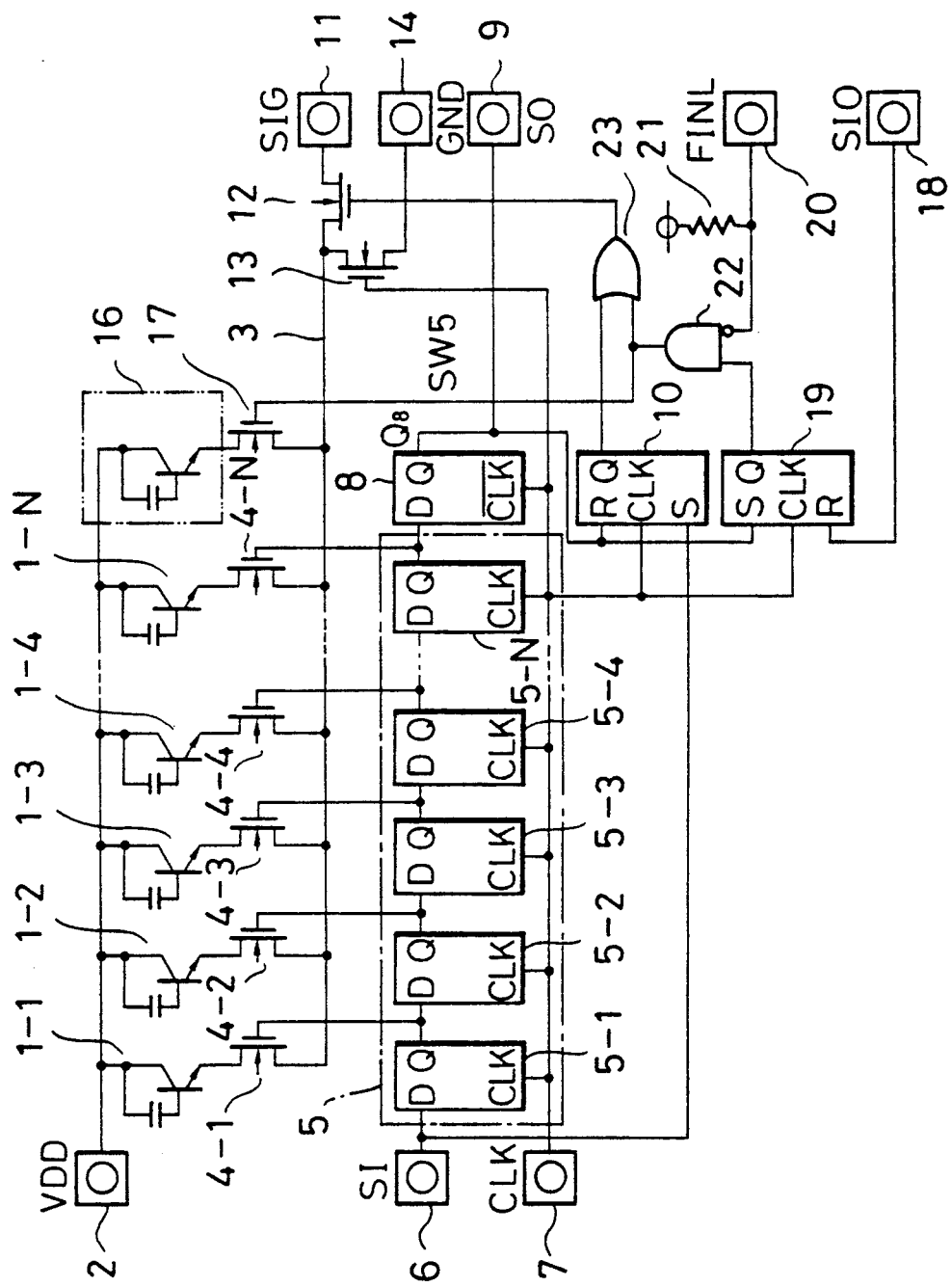
FIG. 8 is a circuit diagram showing an image sensor chip in accordance with one embodiment of the present invention.

The following is a description of one embodiment of the present invention. In FIG. 8, reference numerals identical to those in FIG. 1 denote identical or corresponding elements and their description is omitted.

Figure 1:
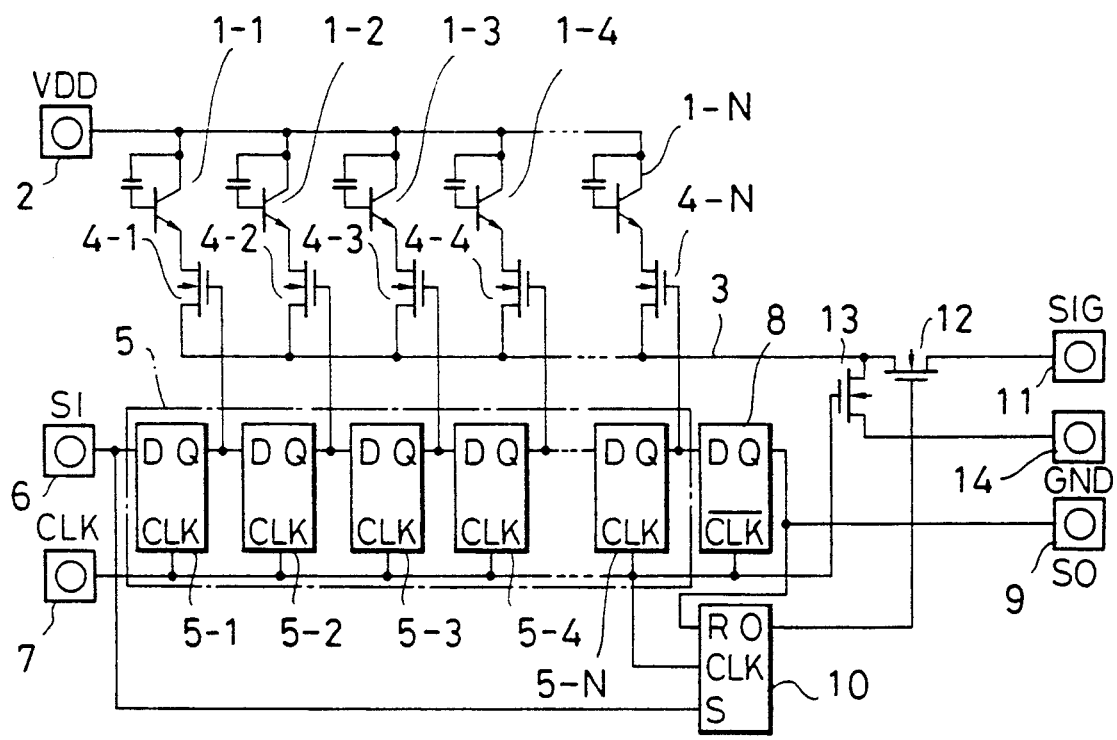
FIG. 1 is a circuit diagram showing an image sensor chip in the prior art.
Figure 2:
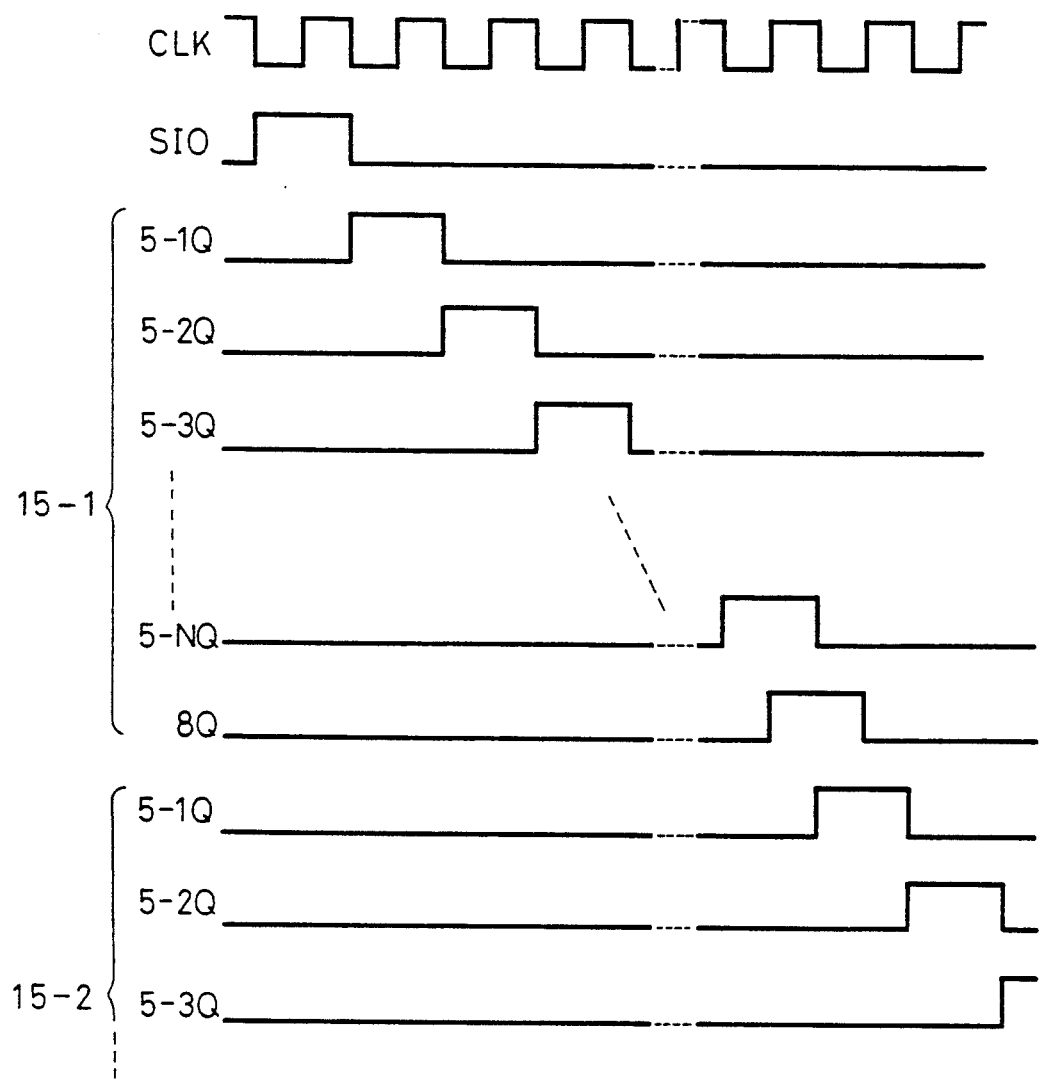
FIG. 2 is a time chart showing the operation of the shift register.

The image sensor chip of this embodiment differs from that of FIG. 1 in that it is additionally provided with a dummy photocell 16 that has a configuration similar to that of the photocells 1-1 to 1-N, but has its sensor window shielded from the light. A dummy select switch 17 is formed, for example, of an n-channel MOS transistor, and is disposed to make selective interconnection between the dummy photocell 16 and the signal line 3.

An electrode pad 18 is for direct input of an initial shift signal SIO supplied to the contact-type image sensor. A flip-flop 19 serves as the driver that generates a signal that continues to drive the dummy select switch 17 upon completion of the period during which photocells 1-1 to 1-N are driven.

An electrode pad 20 is for connection to the ground. The electrode pad 20 of only that image sensor chip which is provided at the last stage of the image sensor is connected to the ground, and the electrode pads 20 of other image sensor chips are disconnected. A pull-up resistor 21 is connected to the electrode pad 20. As a result, the electrode pad 20 of the image sensor chip (e.g., 15-3) at the last stage is at the ground potential, while the electrode pads 20 of the other image sensor chips (15-1 and 15-2) are at the power supply ($V_{DD}$) potential. A logic gate 22 serves as a controller, controlling whether the signal output from the flip-flop 19 is to be made valid or invalid, based on the presence or absence of ground potential applied externally to the electrode pad 20.

A logic gate (OR gate) 23 turns the chip select switch 12 on or off in accordance with the logical sum of the outputs of the logic gate 22 and the flip-flop 10.

Figure 9:
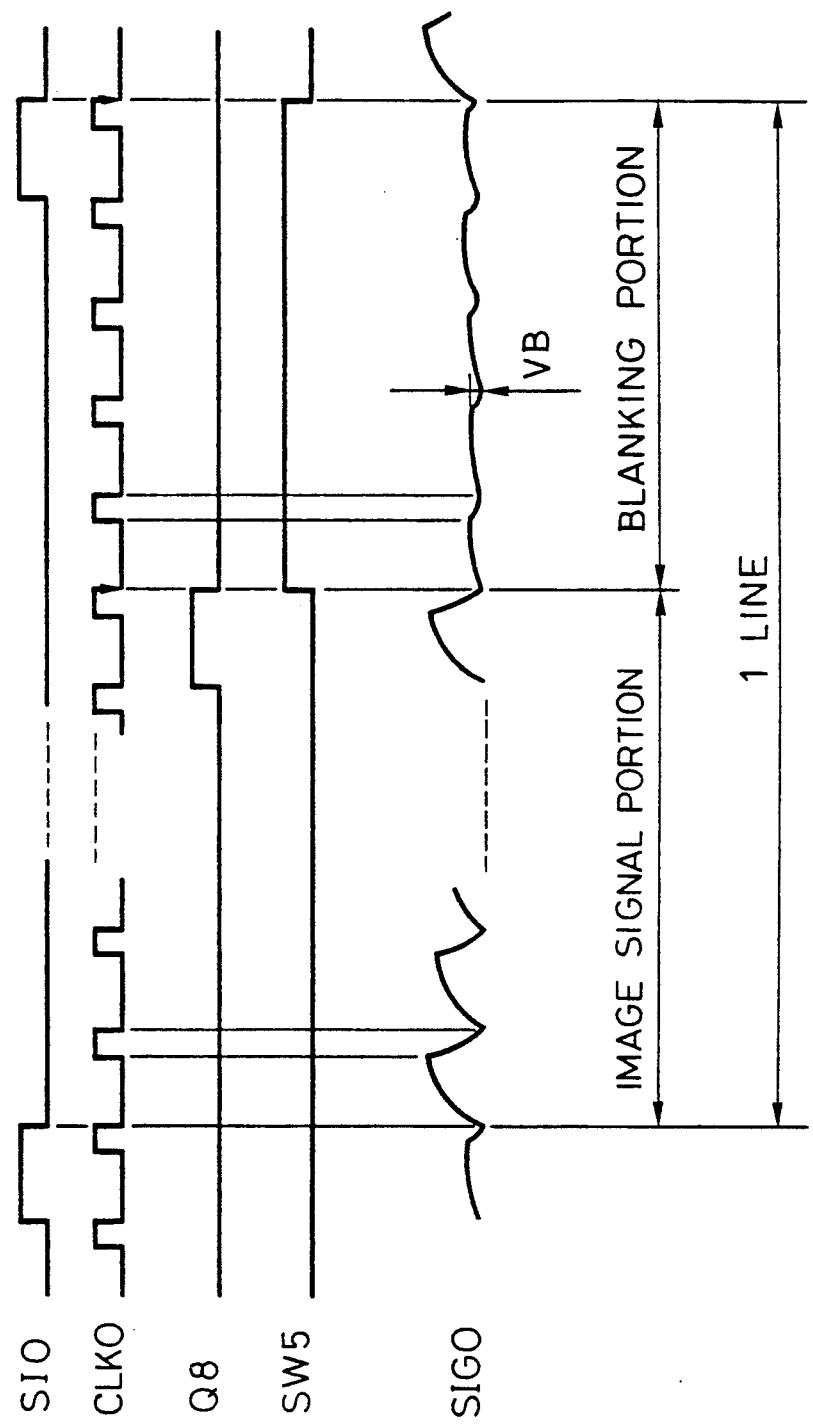
FIG. 9 is a timing diagram showing the operation of a contact-type image sensor formed from the image sensor chips.

FIG. 9 is a timing diagram showing the operation of a contact-type image sensor formed from a plurality of the image sensor chips having the above described configuration.

In the figure, SIO and CLKO respectively designate the initial shift signal and clock pulse applied to this contact-type image sensor, $Q_8$ designates the output signal from the flip-flop 8, SW5 designates a signal that is input to the dummy photocell 16, and SIGO designates the output signal of the contact-type image sensor.

The operation of generating the image signals is identical with that in the prior art, and its description is therefore omitted. Once operation of the last photocell 1-N at each of the image sensor chips is completed, the flip-flop 19 is set by the signal $Q_8$ which is output from the flip-flop 8.

At this time, the electrode pads 20 of all the image sensor chips other than the last one are not at the ground potential, and the logic gate 22 is closed by the power supply voltage applied through the pull-up resistor 21. Accordingly, the signal output from the flip-flop 19, which has been set, goes invalid, the dummy select switch 17 is not turned on, and the output from the dummy photocell 16 is not transmitted to the signal line 3.

Meanwhile, at the final image sensor chip, the electrode pad 20 is at the ground potential with the result that logic gate 22 is open. Accordingly, the signal from the flip-flop 19, which is set on completion of the operation of the final photocell 1-N, becomes valid and is sent to the dummy select switch 17 as the signal SW5.

This turns the dummy select switch 17 on and the signal output by the dummy photocell 16 is transmitted to the signal line 3 as the reference level for the dark output. The signal output by the logic gate 22 is also sent via the logic gate 23 to the chip select switch 12, turning it on.

This status continues until the initial shift signal SIO is once again input and the flip-flop 19 is reset; that is, for the duration of blanking. Thus the reference level of this dark output continues to be output in the blanking portion of output signal SIGO of the image sensor.

As has been described above, according to the embodiment described above, the dummy photocell whose sensor window is shielded from light continues to be connected to the signal line upon completion of the drive period for the photocells of the contact-type image sensor by the signal from the driver made valid, being controlled by the controller in accordance with an external condition. As a result, the reference level for the dark output in the blanking portion of the output signal of the contact-type image sensor can be continuously output, and it is possible to obtain image sensor chips from which a contact-type image sensor can be formed, which can readily follow variations in external conditions such as temperature, voltage and the like, and which can provide stable image quality.

Second Embodiment

Figure 10:
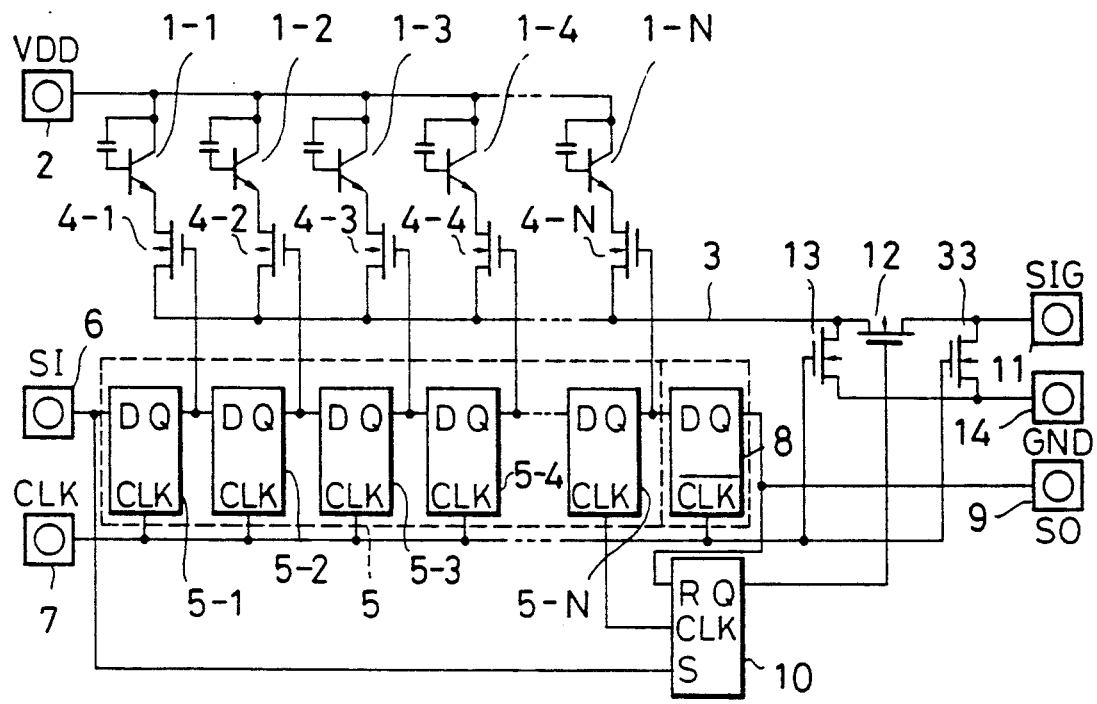
FIG. 10 is a circuit diagram showing an image sensor chip of another embodiment of the invention.

A second embodiment of the invention will next be described with reference to FIG. 10. In the figure, reference numerals identical to those in the prior art denote identical or corresponding elements, so their description is omitted.

The image sensor chip of this embodiment is additionally provided with a switch 33 provided within the image sensor chip and connected between the SIG terminal 11 and the GND terminal 14, and repeatedly turning on and off in response to the change in the level (High level or Low level) of the clock pulse CLK. More specifically, the switch 33 is closed when the clock pulse CLK is High and is open when the clock pulse is Low. The switch 33 may be formed of an n-channel MOS transistor.

The operation of generating the image signals is identical with that in the prior art, and its description is therefore omitted.

Figure 3:
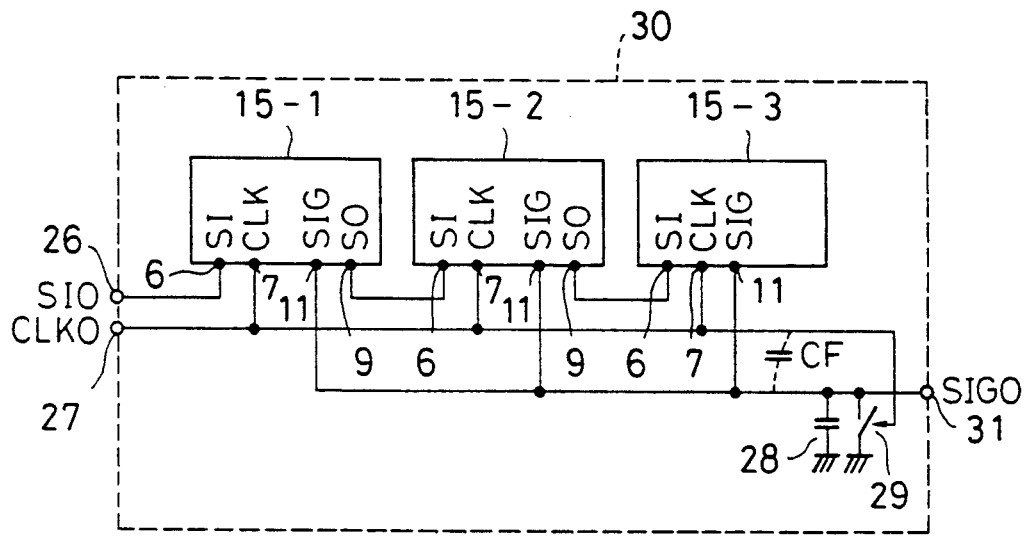
FIG. 3 is a block diagram showing a contact-type image sensor formed from the image sensor chips.
Figure 4:
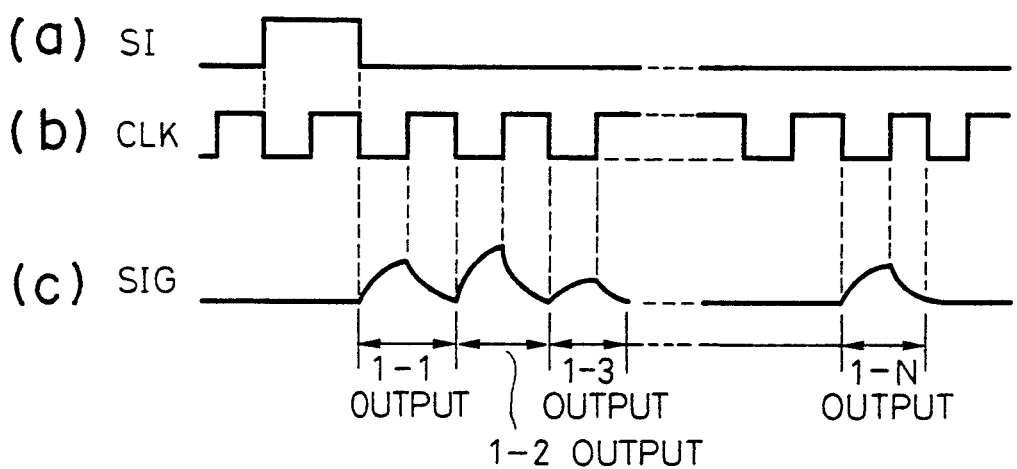
FIG. 4 is a timing chart showing the operation of the image sensor chip for the contact-type image sensor.
Figure 5:
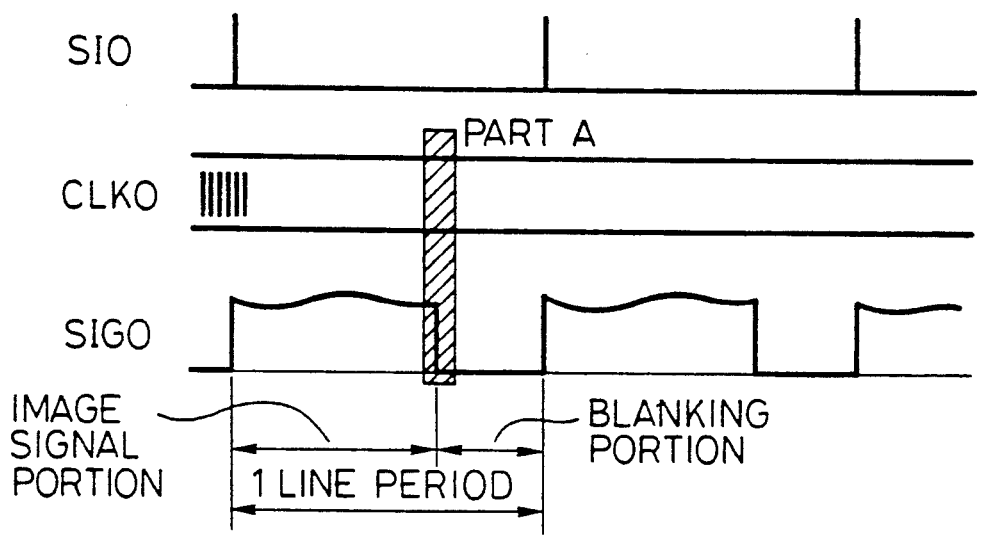
FIG. 5 is a timing chart showing the operation of the contact-type image sensor.
Figure 6:
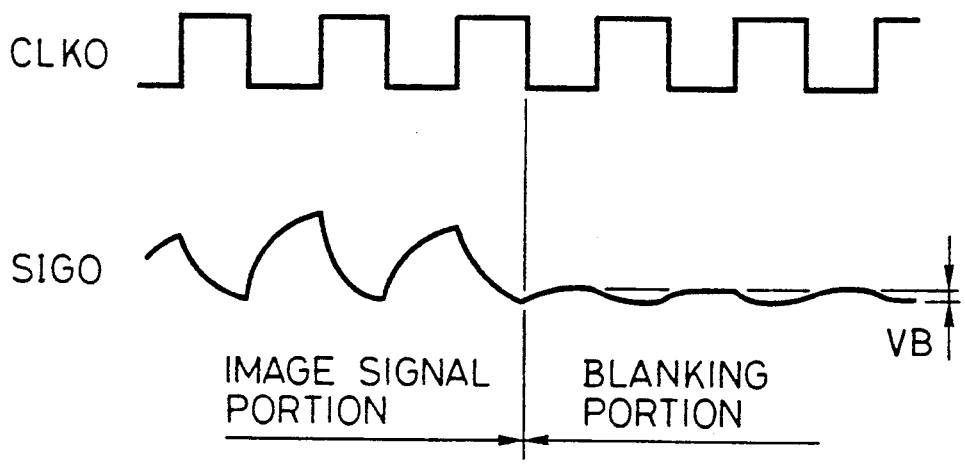
FIG. 6 is an enlarged timing chart showing a portion of FIG. 5.
Figure 7:
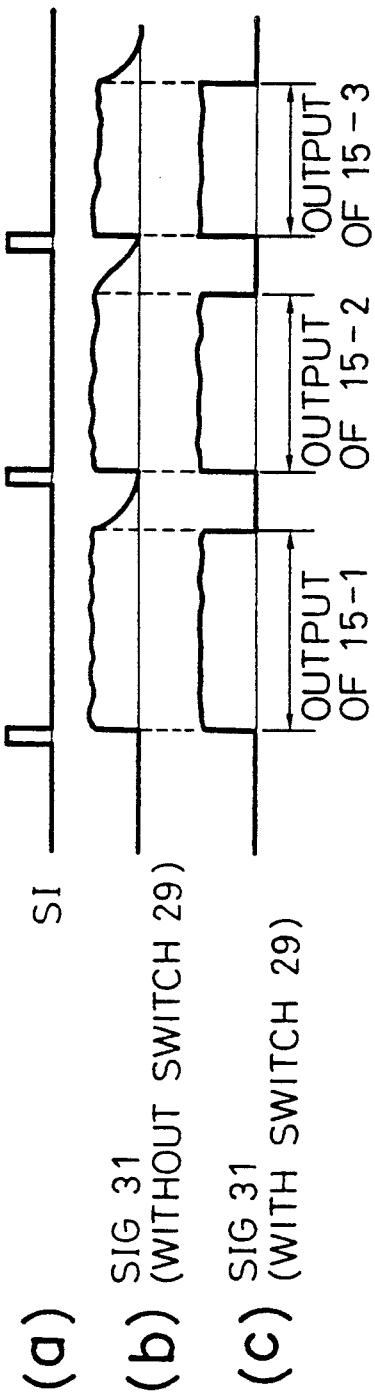
FIG. 7 is a timing chart showing the operation of the image sensor chips for the contact-type image sensor of FIG. 1, which are connected in series.
Figure 11:
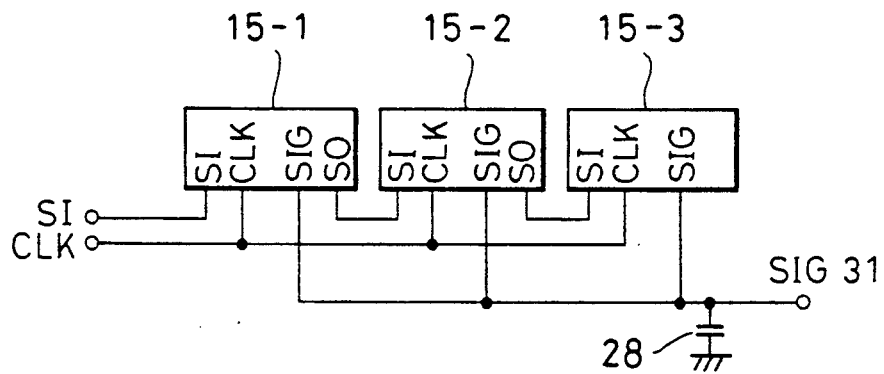
FIG. 11 is a circuit diagram showing a contact-type image sensor comprising a plurality of image sensor chips of FIG. 10.

The image sensor chips of this embodiments are connected in series as shown in FIG. 11, and the waveform-shaping capacitor 28 is connected between the SIG terminal 31 and the ground. The switch 29 in FIG. 3 is however omitted. But the switch 33 inside each sensor chip serves for the same purpose as the switch 29, and is provided between the SIG terminal 11 and GND terminal 14 (within the image sensor chip for the contact-type image sensor). The switch 33 is closed when clock pulse CLK is High to forcibly remove the remaining electric charge from the capacitor 28. With this switch 33, an accurate image signal as shown in FIG. 5 at (c) is obtained.

The switch 33 is fabricated in the same process as the switches 12 and 13, so the increase in the cost due to the addition of the switch 33 is minimal. Since a plurality of the image sensor chips for a contact-type image sensor are used in parallel, a plurality of the switches 33 which are in parallel with each other operate simultaneously. Accordingly, the ON resistance is reduced in proportion to the number of the parallel-connected switches. This heightens the response speed of the image output.

As has been described, according to the above embodiment, a switch which repeatedly turns on and off in response to the change of the level of the clock pulse is provided between the image signal output terminal and the ground terminal, so that the remaining electric charge is forcibly removed from the capacitor for shaping the image signal. As a result, it is no longer necessary to externally provide a switch for forcibly removing the remaining electric charge, and the cost is therefore lowered and the necessity to secure a space for mounting the switch on the board is eliminated.

In the above embodiments, an n-channel MOS transistor is used for each of the switches, including the switches 17 and 33, but a p-channel MOS transistor, a bipolar transistor or other switching device may alternatively be used for the switches.

In the above embodiments, the photocells 1-1 to 1-N are formed of photo-transistors, but they may alternatively be formed of photo-diodes or any other photoreceptors.

In the above embodiments, the channel select switches 4-1 to 4-N are turned on and off in the order from the left to right (4-1 to 4-N) following the operation of the shift register 5. The connection of the shift register 5 may be altered so that the channel select switches are on-off controlled in a different order. The alteration of the order may be achieved by modifying switch drive circuit (shift register).

What is claimed is:
1. An image sensor chip, comprising:
a plurality of photocells arranged in a line, each of said photocells generating an image signal output indicative of a level of brightness of light reflected thereon, such as from a document or the like;
a signal line for outputting image signals from each of said plurality of photocells;
means for sequentially connecting each of said photocell outputs individually to said signal line;
a chip select switch for connecting said signal line to an external terminal during a period in which said photocell outputs are being sequentially connected to said signal line;
a dummy photocell which is shielded from light;
a dummy select switch for selectively connecting said dummy photocell to said signal line;

means for generating a dummy select switch signal subsequent to said period in which said photocell outputs are being sequentially connected to said signal line; and control means for selectively applying said dummy select switch signal to said dummy select switch in response to an external condition.

2. The image sensor chip of claim 1, wherein said external condition corresponds to a connection of said image sensor chip as a last stage of an image sensor formed of a plurality of image sensor chips coupled in stages.

3. The image sensor chip of claim 1, wherein said external condition corresponds to a connection of said image sensor chip to a node of fixed electric potential.

4. The image sensor chip of claim 3, wherein said node of fixed electric potential is at ground potential.

5. An image sensor formed of a plurality of image sensor chips cascaded with each other in stages, each of said image sensor chips comprising:

a plurality of photocells arranged in a line, each of said photocells generating an image signal output indicative of a level of brightness of light reflected thereon, such as from a document or the like;

a signal line for outputting image signals from each of said plurality of photocells;

means for sequentially connecting each of said photocell outputs individually to said signal line;

a chip select switch for connecting said signal line to an external terminal during a period in which said photocell outputs are being sequentially connected to said signal line;

a dummy photocell which is shielded from light;

a dummy select switch for selectively connecting said dummy photocell to said signal line;

means for generating a dummy select switch signal subsequent to said period in which said photocell outputs are being sequentially connected to said signal line; and control means for selectively applying said dummy select switch signal to said dummy select switch in response to an external condition.

6. The image sensor of claim 5, wherein said external condition corresponds to a connection of an image sensor chip as a last stage of said image sensor.

7. The image sensor of claim 5, wherein said external condition corresponds to a connection of an image sensor chip to a node of fixed electric potential.

8. The image sensor of claim 7, wherein said node of fixed electric potential is at ground potential.

9. An image sensor chip for a contact-type image sensor, comprising:

a plurality of photocells each of which outputs a current signal upon detection of light incident thereon;

a plurality of channel select switches respectively connected to outputs of said photocells;

shift register means for sequentially activating said channel select switches in response to a shift signal and successive clock pulses so as to sequentially output said current signals at a signal output terminal via a common signal line;

a chip select switch connected between said common signal line and said signal output terminal and being closed only during the operation of said shift register means; and a switch connected at one end thereof between said chip select switch and said signal output terminal, and at another end thereof to ground, said switch opening and closing in accordance with high and low levels of said clock pluses.

10. The image sensor chip of claim 9, wherein said switch is closed in response to high levels of said clock pulses, so as to discharge a waveform-shaping capacitor coupled to said signal output terminal.

11. An image sensor formed of a plurality of image sensor chips cascaded with each other in stages and mounted on a board having an output terminal and a waveform-shaping capacitor coupled to said output terminal, each of said image sensor chips comprising:

a plurality of photocells each of which outputs a current signal upon detection of light incident thereon;

a plurality of channel select switches respectively connected to outputs of said photocells;

shift register means for sequentially activating said channel select switches in response to a shift signal and successive clock pulses so as to sequentially output said current signals via a common signal line to a signal output terminal coupled to the output terminal of said board;

a chip select switch connected between said common signal line and said signal output terminal and being closed only during the operation of said shift register means; and a switch connected at one end thereof between said chip select switch and said signal output terminal, and at another end thereof to ground, said switch opening and closing in accordance with high and low levels of said clock pulses.

* * * * *